United States Patent [19]

Perrault et al.

[11] 4,039,131
[45] Aug. 2, 1977

[54] CURVED BRACKET

[76] Inventors: Frederick Perrault, 2644 W. 225th St., Torrance, Calif. 90505; Raymond E. Perrault, 2404 Colt Road, Rancho Palos Verdes, Calif. 90274

[21] Appl. No.: 663,511

[22] Filed: Mar. 3, 1976

[51] Int. Cl.² ............................................. F16L 3/08
[52] U.S. Cl. .................... 248/73; 248/222.1; 248/222.2
[58] Field of Search ............... 248/73, 74 B, 70, 49, 248/74 PB, 74 A, 62, 63, 65, 223, 224, 225, 301, 217

[56] References Cited

U.S. PATENT DOCUMENTS

| 617,524 | 1/1899 | Drake | 122/510 |
|---|---|---|---|
| 799,092 | 9/1905 | Rosenfeld | 248/73 |
| 939,368 | 11/1909 | Withem | 122/510 |
| 1,007,138 | 10/1911 | Pierce | 248/68 R |
| 1,056,596 | 3/1913 | Sidoli | 248/65 |
| 1,097,273 | 5/1914 | Tyler | 248/55 |
| 1,229,427 | 6/1917 | Erismann | 248/243 |
| 1,657,939 | 1/1928 | Rockwell | 248/73 |
| 1,775,391 | 9/1930 | Fassinger | 248/73 |
| 1,802,964 | 4/1931 | Brady | 248/73 |
| 1,853,018 | 4/1932 | Knape | 248/243 |
| 1,861,100 | 5/1932 | Stanitz | 248/225.2 |
| 3,032,600 | 5/1962 | Phillips | 429/200 |
| 3,355,132 | 11/1967 | Jenkins | 248/59 |
| 3,771,665 | 11/1973 | Dotter | 211/107 |
| 3,794,183 | 2/1974 | Colbridge | 211/208 |

FOREIGN PATENT DOCUMENTS

| 499,910 | 6/1951 | Belgium | 248/300 |
|---|---|---|---|
| 1,960,111 | 6/1971 | Germany | 248/70 |
| 379,189 | 8/1964 | Switzerland | 248/65 |

Primary Examiner—Robert A. Haffer
Attorney, Agent, or Firm—Gausewitz, Carr & Rothenberg

[57] ABSTRACT

This invention provides a bracket having an arcuate portion with an upper surface defined by a cylindrical segment having a flange at either edge, extending to a straight portion at one end of the arcuate portion, the straight portion having two ribs which are in part continuations of the flanges, and a flat central surface inset from the crests of the ribs. The lower edge of the central surface is spaced from and displaced to one side of the upper edge of the arcuate surface so as to provide a slot used in attaching the bracket to one form of support. Also, there is an opening through the central surface which can receive a fastening element. An L-shaped adapter with oppositely projecting lugs can be used with the bracket for attachment to a slotted supporting member.

16 Claims, 12 Drawing Figures

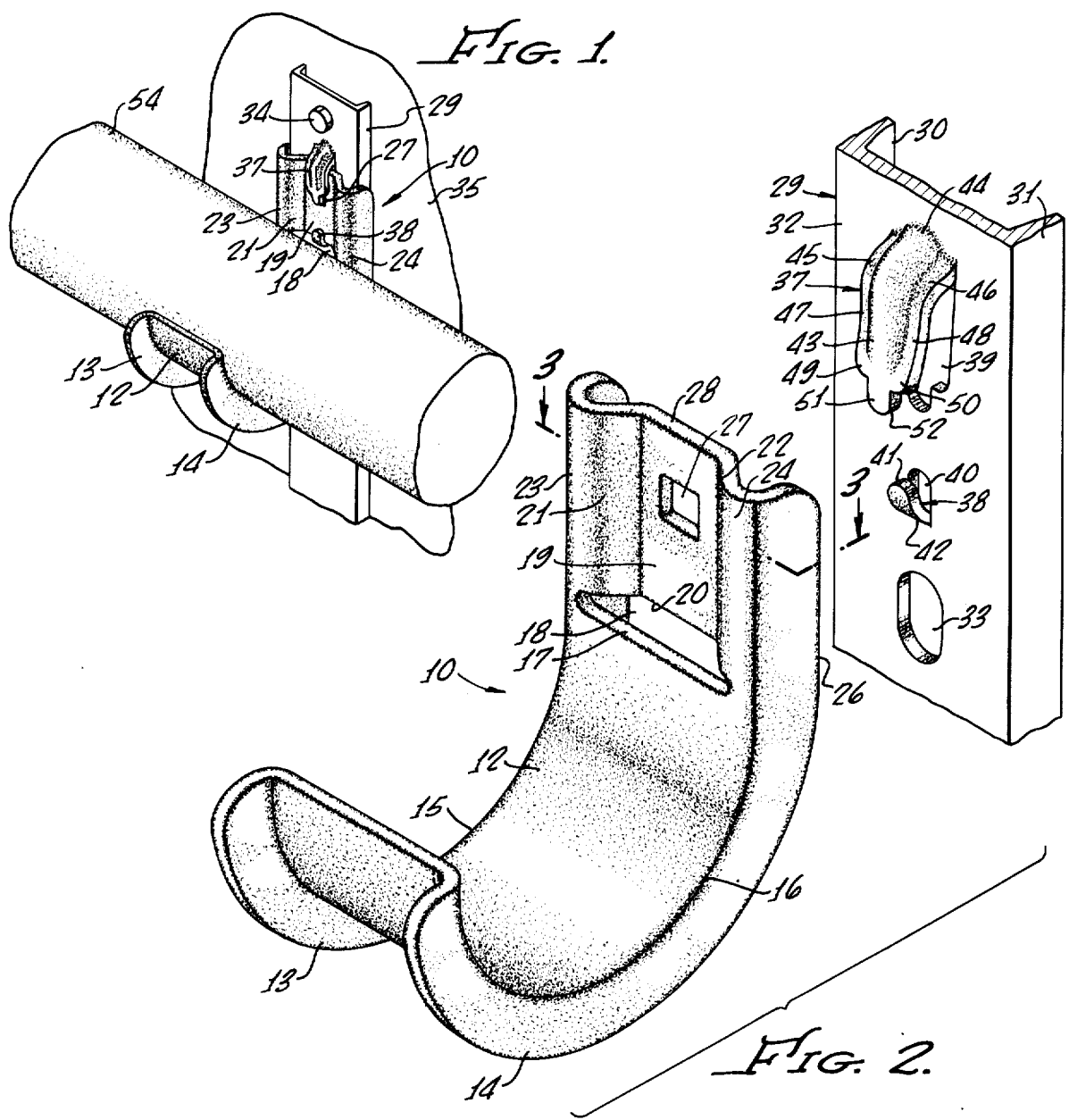
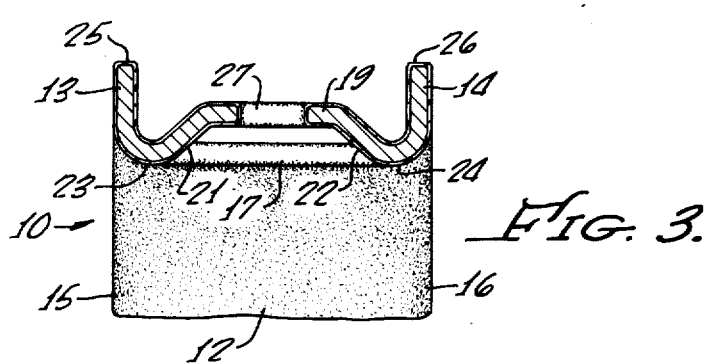

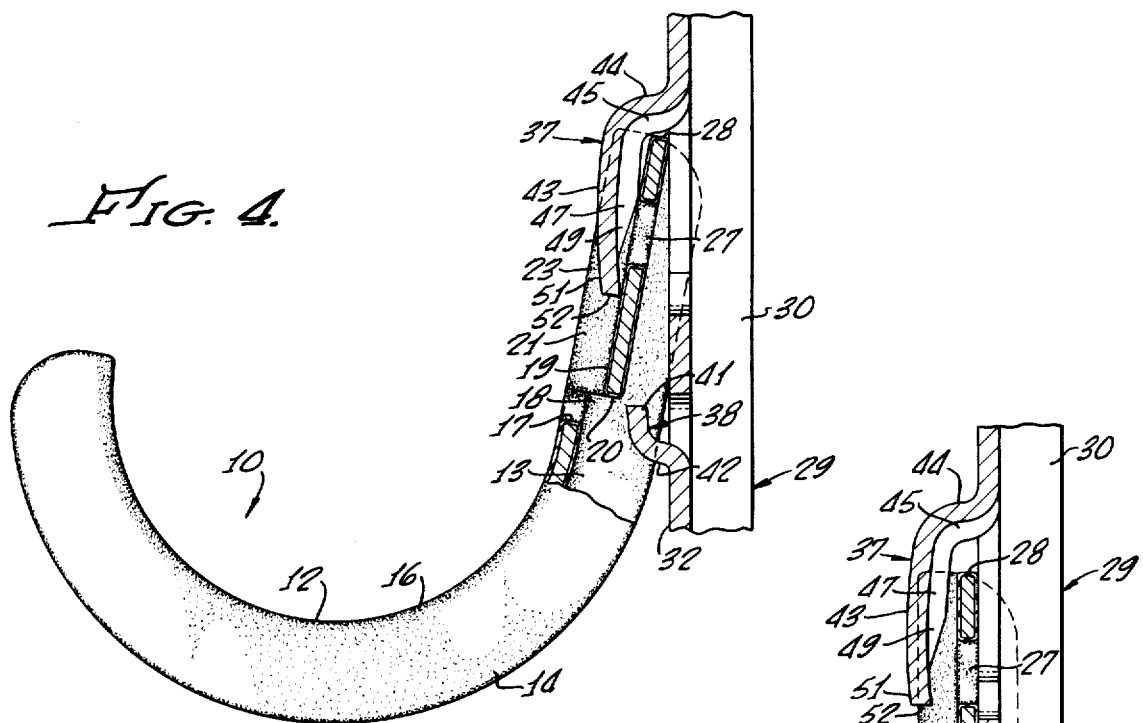
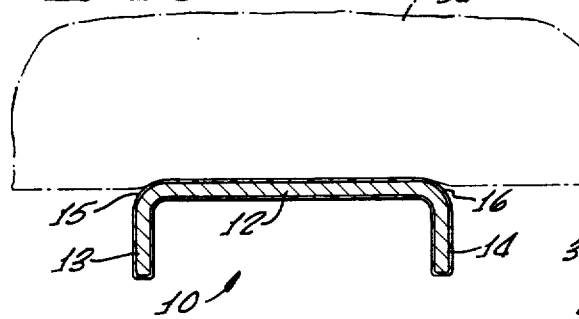
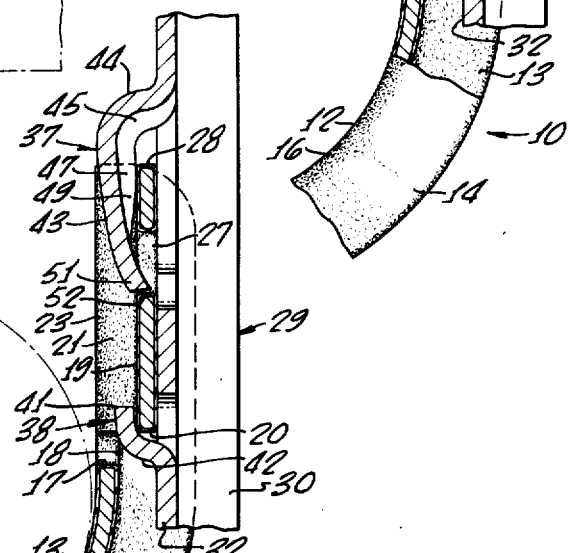
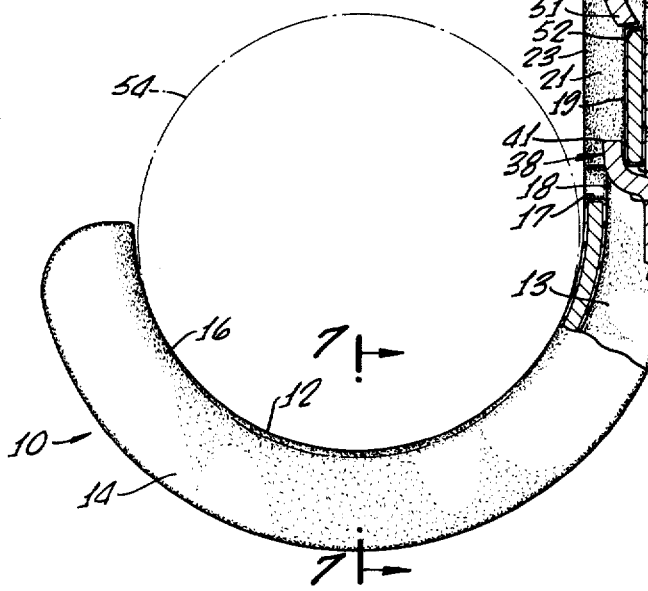

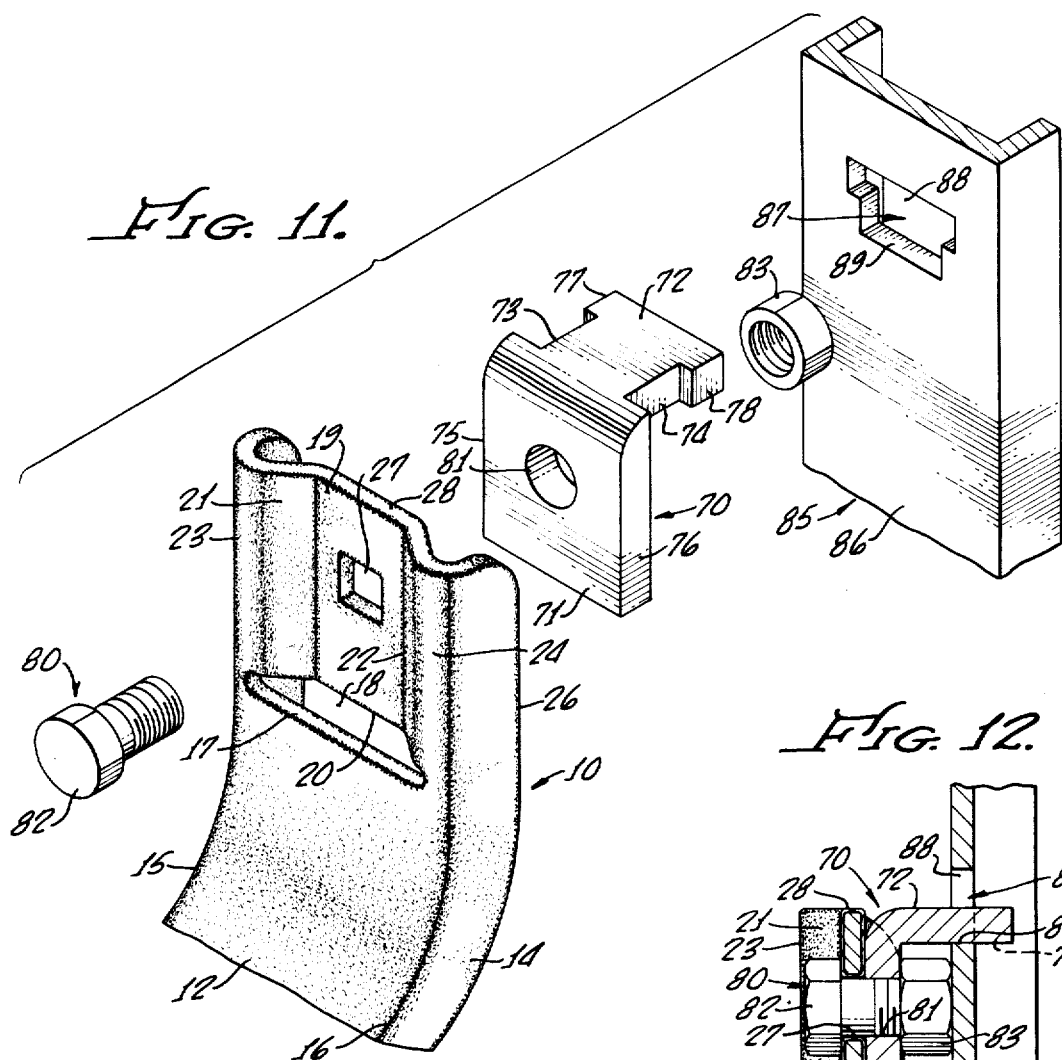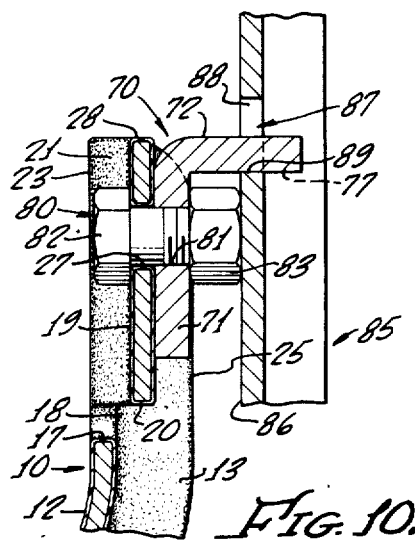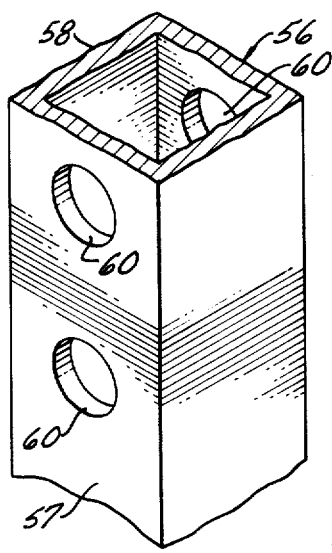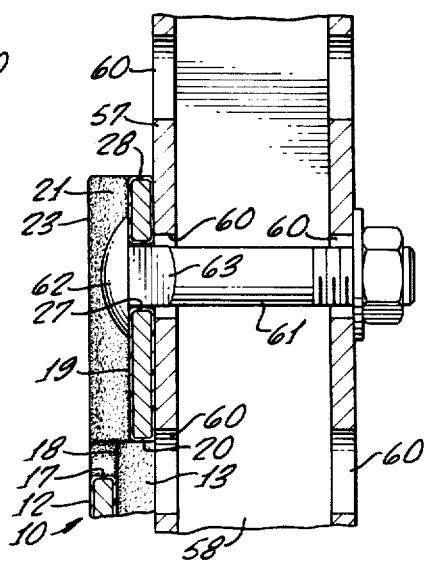

CURVED BRACKET

BACKGROUND OF THE INVENTION

1. Field of the Invention

This invention relates to a supporting device for cables or the like.

2. Description of the Prior Art

It is common to support electrical and communication cables on brackets in underground systems and other locations. Some of these cables are relatively large in diameter and heavy, and are protected by an outer insulating covering that is soft and vulnerable to cutting or tearing. Such cables require curved supporting surfaces and must be handled carefully to avoid catching or tearing on mounting bolts or the like. The brackets used with these cables in the past generally have been straight members carrying auxiliary supporting devices, sometimes of porcelain, upon which the cable rests. The bracket assemblies have been somewhat complex and expensive, yet limited in their load-carrying capacity. It is time consuming and therefore costly to secure these devices to their supports. Generally these supports are adapted for only one kind of supporting element so that they are not of universal applicability and must be used only where they are the proper supporting elements available. Another problem has centered around the vertical spacing of the brackets, which must be relatively large, in most instances preventing the supported cables to be accommodated with maximum density.

An improved bracket is described in our earlier U.S. Pat. No. 3,923,277, which is a device of greater capacity and adaptability. Nevertheless, it provides a straight horizontal supporting surface rather than an arcuate one as needed for cables with soft coverings. Moreover, the attaching screw, bolt or other fastening element to secure the bracket to the support is exposed to the load-carrying portion of the bracket. This raises the possibility of contact of the fastening element with the soft installation of the cable and the consequent possibility of damage to the cable.

SUMMARY OF THE INVENTION

The present invention provides an improved bracket which overcomes the problems of the prior art, being strong, versatile, economical to make and use, and affording superior protection to the cable being supported.

The device includes an integral member having an arcuate portion with a central wall which is defined by a cylindrical segment. The wall is relatively wide to provide large area contact with the cable and extends through an arc of approximately 180°. The cable is received on this surface and needs no strap to hold it in place. A flange extends downwardly from either side edge of the central wall of the curved portion, these flanges improving the strength and rigidity of the bracket. A short straight section is at one end of the curved portion, the side flanges extending to this part and forming flanges for the straight portion of the bracket. A central wall of the straight portion is recessed inwardly so that it is displaced from the end of the upper surface of the arcuate portion. Inclining from the edges of the straight central wall are segments which extend to rounded outer surfaces that connect to the side flanges. These portions of the straight part of the bracket provide strengthening ribs. They also recess the central wall beneath the outer extremities of the ribs. An opening is formed in the central wall which may receive a bolt, screw or the like used in securing the bracket to a support. When this is done the heat of the fastener is fully recessed beneath the ribs so that it will not engage the cable on the support.

The bottom edge of the central wall is spaced longitudinally of the bracket away from the upper edge of the cylindrical segment of the arcuate portion of the bracket as well as being inset from it. This provides a slot between the two portions of the bracket which is used in attaching to a different type of support such as that disclosed in our copending application Ser. No. 633,421, filed Nov. 19, 1975, for Bracket Support. Tabs are used as the fasteners in this design, one receiving the bracket edge at the slot and another being bent into the opening in the central wall.

In addition, there may be provided an adapter which enables the bracket to be secured to a slotted supporting member. The adapter is L-shaped in side elevation with one wall having an opening allowing it to be bolted to the back side of the central wall of the straight portion of the bracket. The other section of the adapter has laterally projecting lugs at its outer ends which can lock into a slotted support. When this is done the nut that attached the adapter to the bracket absorbs the torque loads applied to the bracket transmitting them to the supporting member By virtue of the construction described above, the bracket of this invention is extremely versatile, being attachable to various types of supporting members as well as flat walls or bulkheads. In all events the attaching elements are recessed beneath the outer parts of the ribs for protecting the cable against damage. The bracket is a simple device of extremely high load-carrying capacity and very easily and rapidly attached to a support. The configuration of the bracket allows close spacing so that maximum density of the cables may be obtained

BRIEF DESCRIPTION OF THE DRAWINGS

FIG. 1 is a perspective view of the bracket of this invention, secured to a support and holding a cable;

FIG. 2 is an enlarged exploded perspective view of the bracket and a support;

FIG. 3 is a transverse sectional view of the bracket taken along line 3—3 of FIG. 2;

FIGS. 4, 5, and 6 are sectional views showing the steps in attaching the bracket to the support;

FIG. 7 is a transverse sectional view taken along line 7—7 of FIG. 6;

FIG. 8 is a fragmentary perspective view of a square tube for supporting the bracket;

FIG. 9 is a fragmentary longitudinal sectional view showing the attachment of the bracket to the square tube of FIG. 8;

FIG. 10 is a fragmentary longitudinal sectional view showing the attachment of the bracket to a flat wall;

FIG. 11 is an exploded perspective view of the bracket, a slotted supporting member, and an adapter for connecting the bracket to the slotted supporting member; and FIG. 12 is a fragmentary longitudinal sectional view showing the attachment of the bracket to the supporting member through the use of the adapter

DESCRIPTION OF THE PREFERRED EMBODIMENT

The bracket 10 of this invention, as shown in FIGS. 1, 2, and 3, is an integral member, normally made of steel, which may be plastic coated. It includes a principal arcuate part upon which the load rests when the bracket is in service. This portion includes a relatively wide wall 12 which is contoured as a cylindrical segment, concave upwardy. Parallel flanges 13 and 14 project downwardly at right angles from the wall 12 at either side. The corners 15 and 16 between the wall 12 and the flanges 13 and 14 are rounded so as to be convex upwardly.

The inner end of the wall 12 terminates in an edge 17 that is perpendicular to the side flanges 13 and 14 and forms the lower boundary of a transverse slot 18. Above the slot 18 is a second part of the bracket having a flat vertical central wall 19 which is displaced outwardly from the upper edge 17 of the wall 12, The wall 19 has a lower edge 20, offset and facing in the opposite direction from the edge 17 of the wall 12, that provides the upper boundary of the transverse slot 18. Divergent surfaces 21 and 22 incline from the central upper wall 19 toward the sides of the bracket and merge into rounded surfaces 23 and 24. The outer portions of the latter surfaces form continuations of the corners 15 and 16, and connect to the side flanges 13 and 14. The latter elements are straight at this portion of the bracket, having flat outer edges 25 and 26. As a result of this configuration, the inclined surfaces 21 and 22, together with the side flanges 13 and 14 and the rounded connecting portions 23 and 24, provide parallel longitudinal ribs which strengthen the upper portion of the bracket and make it rigid. The rounded surfaces 23 and 24 form the crests of these ribs, parallel to the central wall 19 which is recessed beneath them.

The transverse slot 18 continues beyond the central wall 19 into the inclined rib surfaces 21 and 22, extending to the crests of the ribs at the rounded connecting surfaces 23 and 24. Thus, the lower edge 20 continues beyond the central wall 19 into the inner parts of the ribs.

An opening 27 is formed in the center of the upper central wall 19, intermediate its lower edge 20 and the upper edge 28 of this wall. Preferably this is a square opening, as illustrated.

The brackets 10 may be associated with a downcomer 29 of the type disclosed in our copending application Ser. No. 633,421, as indicated in FIGS. 1 and 2. The downcomer 29 is in the form of a channel having side flanges 30 and 31 interconnected by a flat central web 32. Spaced openings 33 are provided in the central web 32 for receiving fasteners, such as screws 34, which secure the downcomer 29 to a structure such as a bulkhead or wall 35. The downcomer 29 is attached so that the outer edges of the flanges 30 and 31 engage the structure 35 and the web 32 faces outwardy. The openings 33 are elongated longitudinally of the channel to allow for misalignment of the openings in the bulkhead 35 for the screws 34.

At regularly spaced locations along the downcomer 29 are sets of tabs 37 and 38 which extend from the central web 32 on the side opposite the flanges 30 and 31. The tabs 37 and 38 which face in opposite directions, are integral with the web 32, being formed by severing the web 32 and bending the tabs outwardly, which results in openings 39 and 40 beneath the tabs.

The tabs 38 face upwardly and are smaller both laterally and longitudinally than are the tabs 37. The outer parts 41 of the tabs 38, which have rounded upper edges, overlap and are generally parallel to the plane of the web 32, although they incline away from the surface of the web at a very shallow angle. The inner parts 42 of the tabs 38, at their lower ends, incline to their connections with the web 32.

Each of the downwardly facing upper tabs 37 includes an outer central portion 43 which is rounded transversely so as to be convex when viewed from the outside and which extends in a direction substantially parallel to the central web 32. An inclined inner portion 44 extends from the portion 43 to the web 32. The side portions of the tab 37 include inclined inner parts 45 and 46 extending from the web 32 on either side of the portion 44, connecting to parts 47 and 48 that are substantially parallel to the web 32. The latter side parts are closer to the web 32 than the central convex part 43 between them. From there, the side parts 49 and 50 incline outwardly away from the web 32 to substantially the end of the central convex part 43. At the distal end of each tab 37, beyond the convex portion 43, is a relatively narrow flat projection 51 which has a rounded lower edge 52. The projection 51 inclines inwardly toward the central web 32 at a very shallow angle.

The bracket is attached to the downcomer 29 in the sequence of steps illustrated in FIGS. 4, 5, and 6. The parts are proportioned so that the upper portions of the side flanges 13 and 14 of the bracket 10 can receive the side flanges 30 and 31 of the donwcomer 29. The tab 37 is spaced outwardly from the central web 32 a distance greater than the wall thickness of the bracket 10. This enables the flat upper central wall 19 of the bracket to be inserted beneath the tab 37, in the manner shown in FIG. 4. The upper edge 28 of the upper central wall 19 then engages the central web 32 of the downcomer 29 and the bracket is inclined upwardly. The upper central wall 19 of the bracket 10, between its upper edge 28 and its lower edge 20 at the slot 18, is just slightly shorter than the spacing between the upper end 41 of the tab 38 and the inclined side parts 45 and 46 of the tab 37 at the web 32. As a result, it is possible to rotate the bracket 10 counterclockwise from the position of FIG. 4, clearing the lower tab 38, to bring the bracket section 19 to bear against the central web 32. After this, the bracket 10 is slid downwardly to the position of FIG. 5. This brings the lower edge 20 of the upper central wall 19 behind the lower tab 38, which is closer to the web 32 than the tab 37, where it fits snugly.

The attachment of the bracket 10 is completed by bending the lower end portion 51 of the tab 37 inwardly, as indicated in FIG. 6, which is accomplished easily by a blow from a hammer. When the tab 37 is struck, the end portion 51 is bent inwardly to enter the opening 27 in the upper central wall 19. The end portion 51 then inclines more steeply toward the web 32 and its rounded lower edge 52 is located very close to the periphery of the opening 27 at the lower part of this opening. Also, the side portions 47 and 48 of the tab 37 then are brought down on the upper central wall 19 of the bracket 10 adjacent the upper edge 28. This holds the bracket 10 securely to the downcomer 29.

The lower edge portion 52 of the end 51 of the tab 37 acts as a downwardly facing abutment and the lower periphery of the opening 27 forms an upwardly facing abutment that cooperate to prevent upward movement of the bracket 10 relative to the downcomer 29. Downwardly bracket movement is precluded by the lower tab 38, engaged by the lower edge 20 of the upper central wall 19. Rotation of the bracket is precluded by its side flanges 13 and 14 that fit snugly over the sides of the downcomer 29.

As installed on the downcomer 29 in this manner, the bracket 10 is adapted to support a relatively large cable 54. This may be of a size having an outside diameter as great as that of the cylinder of which the bracket surface 12 is a segment. Smaller cables also may be supported. With the surface 12 being curved and relatively wide in a direction transverse to the bracket there is considerable area contact between the bracket and the cable that it supports. The cable can deflect over the rounded corners 15 and 16 without damage to its outer covering. This enables the bracket 10 to give adequate and safe support to cables having relatively soft outer insulation.

In most instances, there is no need for extending a strap around the upper surface of the cable because there is little likelihood of the cable's becoming displaced from the bracket. This arises from the length of the arc, approximately 180°, described by the main bracket portion at the surface 12. Thus, the bracket wraps around half of the cable 54 so that the cable is securely retained. However, a strap can be used if desired, extending around the outer end of the wall 12, around the cable and through the slot 18.

Several of the brackets 10 may be secured to each downcomer 29 positioned one above the other. The arcuate nature of the supporting portion of the bracket 10, together with the relatively short straight portion 19 which is used in attaching the bracket to the support, enables the brackets to be spaced close together in the vertical direction. The upward curvature of the outer bracket portions enable a cable to be fitted between two brackets and dropped down onto the supporting surface 12 even though the brackets are quite close together The ribs at the upper end of the bracket 10, as well as the flanges 13 and 14, impart strength and rigidity to the bracket to enhance its load-carrying characteristics. The arcuate bracket shape positions the object supported close to the support, minimizing torque loads on the bracket. Another advantage is realized from the ribs with the resultant recessing of the upper central wall 19. This causes the tabs 37 and 38 to be entirely beneath the rounded outer surfaces 23 and 24 of the ribs when the bracket is installed. The cable 54, therefore, will never engage the tabs 37 and 38. Instead, the cable engages only the rounded contours of the bracket so that there are no surfaces which can catch on the insulation of the cable and cut or tear it. Accordingly, the recessed attaching arrangement affords important protection to the cable being supported.

The bracket 10 is adapted to be secured to other types of supports, such as the square tube 56 illustrated FIGS. 8 and 9. In this attachment, the upper central wall 19 lies against one of the principal surfaces 57 of the square tube 56, with the side flanges 13 and 14 of the bracket overlapping the sides 58 and 59 of the tube. The tube 56 includes a series of opposed openings 60 through its walls, two of which receive a bolt 61 used in attaching the bracket 10 to the tube 56. The bolt extends through the opening 27 of the bracket, with the bolt head 62 bearing against the outer surface of the upper central wall 19 between the ribs. In the example of FIG. 9, the bolt 61 is a carriage bolt with its square neck 63 received in the square opening 27 of the bracket 10. With this type of bolt, the head 62 is rounded with no edges of any kind protruding. This gives further assurance that the insulation of the cable 54 will not become damaged even if in some manner it were forced into the space between the ribs of the bracket.

In the example of FIG. 10, a bracket 10 is attached to a bulkhead or wall 65. A screw 66 extends through the opening 27 of the bracket and into a tapped hole 67 in the wall 65. The head 68 of the screw is recessed beneath the outer surfaces 23 and 24 of the ribs in protecting the insulation of the cable to be supported. When the bracket 10 is attached to a flat surface, such as the wall 65, the edges 25 and 26 of the flanges 13 and 14 bear against the outer face of the wall. The edges 25 and 26, by being straight and spaced apart, provide a stable support for the bracket when the screw 66 is tightened.

The bracket 10 may be attached to a slotted support through the use of the adapter 70, illustrated in FIGS. 11 and 12. The adapter 70 is L-shaped in side elevation, having a principal wall 71 of flat rectangular configuration, from one edge of which projects a second flat wall 72. The wall 72 is relatively narrow adjacent the wall 71, having opposite side edges 73 and 74 which are more closely spaced than the side edges 75 and 76 of the wall 71. The outer end of the wall 72 is widened, having lateral protuberances forming lugs 77 and 78.

The adapter 70 is attached to the bracket 10 by extending a bolt 80 through the opening 27 of the bracket and a corresponding opening 81 in the wall 71 of the adapter. As before, the head 82 of the bolt is recessed beneath the rounded outer surfaces 23 and 24 of the ribs at the upper end of the bracket. The shank of the bolt 80 is proportioned so that it does not project beyond the outer end of the nut 83 that engages it. The support 85 of FIG. 11 has an outer wall 86 through which is an opening 87 which is elongated transversely. The opening 87 includes a relatively wide upper portion 88 and a narrower portion 89 below it. The portion 88 of the opening 87 is made wide enough to allow the wall 72 to pass through it at its wider outer portion at the lugs 77 and 78. The narrower portion 89 of the wall is dimensioned so that it will receive the narrower portion of the wall 72 between the side edges 73 and 74. Consequently, the bracket is installed by extending the outer part of the wall 72 through the wide portion 88 of the opening 87 so that the lugs 77 and 78 are on the rearward side of the wall 86. The bracket and adapter then are moved downwardly bringing the narrower portion of the adapter wall 72 into the narrower opening section 89. The lugs 77 and 78 then overlap the back side of the wall 86 holding the adapter 70 to the support. The main torque loads imposed on the bracket are absorbed by the nut 83 which bears against the outer face of the wall 86 beneath the adapter wall 72. In this type of installation it may be preferred to provide a locking arangement by inserting a member into the upper opening portion 88 to prevent the adapter 70 from being moved upwardly which could allow it to become dislodged from the support 85.

As the examples discussed above illustrate, the bracket 10 of this invention is extremely versatile and adapted to be secured to almost any kind of existing supporting arrangement. In this way it is equally suitable as a replacement for other brackets and as a bracket selected for new installations.

The foregoing detailed description is to be clearly understood as given by way of illustration and example only, the spirit and scope of this invention being limited solely by the appended claims.

We claim:

1. A bracket comprising a member having
   an arcuate first portion having
     a first wall,
     and a flange extending from either side edge of said first wall,
   and a second portion having
     a second wall,
     and two ribs positioned one on either side of said second wall,
       said ribs having arcuate crests, said second wall being recessed inwardly from said crests, said first wall extending away from said second wall and providing a supporting surface which is concave upwardly, said supporting surface being substantially flat transversely thereof,
     said first wall having an upper edge facing toward said second portion,
     said second wall having a lower edge displaced laterally from said upper edge of said first wall and spaced therefrom longitudinally of said member thereby to define a slot,
     said lower edge of said second wall facing toward said first portion,
     said second wall above said lower edge thereof including means for engaging an attaching means for securing said member to a supporting structure.

2. A device as recited in claim 1 in which said flanges are substantially at right angles to said supporting surface.

3. A device as recited in claim 1 in which said flanges extend to said second portion and form the outer portions of said ribs, and said first portion includes corner portions between said first wall and said flanges, said corner portions extending to said first portion and forming continuations of said crests of said ribs.

4. A device as recited in claim 1 in which said second wall is substantially flat, and said two ribs are parallel to said second wall.

5. A device as recited in claim 4 in which said ribs include surfaces inclining upwardly and outwardly from the edges of said second wall, and arcuate portions forming said crests and connecting to said surfaces of said ribs.

6. A device as recited in claim 5 in which said inclined surfaces have lower edges forming continuations of said lower edge of said second wall and defining portions of the upper boundary of said slot.

7. A device as recited in claim 6 in which said slot extends substantially to said arcuate outer portions of said ribs 8. A device as recited in claim 1 in which said first wall is defined by a segment of a cylinder.

9. A device as recited in claim 8 in which said first wall extends through an arc of substantially 180°.

10. A device as recited in claim 9 in which said first surface is connected to said flanges through rounded corners which are convex upwardly.

11. A device as recited in claim 1 in which said ribs include surfaces inclining upwardy and outwardly from the edges of said second wall, and arcuate portions forming said crests and interconnecting said inclined surfaces and said outer portions of said ribs.

12. A device as recited in claim 11 in which said outer portions of said ribs have substantially straight outer edges.

13. A bracket comprising a member having
    a first portion,
      said first portion being arcuate and having a first wall
    and a second portion having
      a second wall,
      and rib means having an outer crest,
        said second wall being recessed inwardly from said crest of said rib means,
      said first wall having an upper edge facing toward said second portion,
      said second wall having a lower edge displaced laterally from said upper edge of said first wall and spaced therefrom longitudinally of said member thereby to define a slot,
      said lower edge of said second wall facing toward said first portion,
      said second wall above said lower edge thereof including means for engaging and attaching means for securing said member to a supporting structure,
    a second member,
      said second member having a first portion engaging said second wall, and a second portion extending outwardly from said first portion,
        said second portion having transverse lugs remote from said first portion for engaging a support member
    and means connecting said first portion to said second wall.

14. A device as recited in claim 13 in which said second wall includes an opening therethrough, said first portion includes an opening therethrough, and said means connecting said first portion to said second wall includes a fastener extending through said openings 15. A device as recited in claim 14 in which said fastener is a bolt having a head engaging said second wall, a shank extending through said openings, and a nut engaging said second portion, said shank extending no further outwardly than substantially the outer end of said nut, whereby said nut can engage a supporting member for absorbing loads imposed on said first-mentioned member.

16. A device as recited in claim 15 in which said first portion is a first flat wall overlying said second wall, and said second portion is a second flat wall extending outwardly from the upper edge of said first flat wall, said lugs projecting from the side edges of the outer end of said second flat wall.

* * * * *